United States Patent [19]

Varela et al.

[11] Patent Number: 4,772,131
[45] Date of Patent: Sep. 20, 1988

[54] SIGNAL PROCESSING APPARATUS FOR ULTRASONIC THERMOMETERS

[75] Inventors: David W. Varela, Tucson, Ariz.; Thomas M. Kerley, Albuquerque, N. Mex.; Andrew R. Gariepy, Tucson, Ariz.

[73] Assignee: Thermosonics, Inc., Tucson, Ariz.

[21] Appl. No.: 31,757

[22] Filed: Mar. 30, 1987

[51] Int. Cl.[4] .......................................... G01K 11/22
[52] U.S. Cl. ..................................... 374/119; 73/597
[58] Field of Search ...................... 374/117, 118, 119; 73/597, 579

[56] References Cited

U.S. PATENT DOCUMENTS

| 3,540,265 | 11/1970 | Lynnworth | 374/119 |
| 3,717,033 | 2/1973 | Gordon et al. | 374/119 |
| 4,469,450 | 9/1984 | DiVincenzo | 374/119 |
| 4,483,630 | 11/1984 | Varela | 374/119 |
| 4,541,732 | 9/1985 | Shah | 374/119 |
| 4,676,663 | 6/1987 | Tehon | 374/119 |

OTHER PUBLICATIONS

Carlson et al. "An Ultrasonic Thermometry System for Measuring Very High Temperatures in Reactor Safety Experiments," Sandia Report No. SAND-79-0621, Jun. 1979, pp. 1-80.

Primary Examiner—William A. Cuchlinski, Jr.
Assistant Examiner—Patrick R. Scanlon
Attorney, Agent, or Firm—J. Michael McClanahan

[57] ABSTRACT

Improvements in electronic apparatus connected with operation of ultrasonic thermometers consisting of an initiating electrical pulse generator which permits selection of the repetition rate at which the ultrasonic thermometer is to be operated, and, to avoid electrical interference caused by power switching, selective commencement of the initiating electrical pulse relative to the power line. Electronic amplifying and transmitting circuitry receiving the reflected information signal pulses from the ultrasonic thermometer amplify the pulses for transmission to pulse processing circuits remotely located from the furnace, assuring that sufficient signal amplitude is received by means of a returned automatic gain control signal to the amplifying and transmitting circuitry. The pulse processing circuitry utilizes a zero cross detector to ascertain the presence of reflected information signal pulses and separates low level noise from the reflected information signals in a peak detector circuit to present individual pulses for each initiating pulse and each reflected pulse from each discontinuity in the temperature sensing rod of the ultrasonic thermometer. Such is accomplished in a way as to minimize errors which can be caused by power line voltage variations, power line failures, and ambient temperature changes and in such a way as to minimize the complexity and cost of the circuitry. To ascertain that unwanted reflections are eliminated, a sync pulse processor generates a time window to block out all reflected pulses outside the time window of the information pulses of interest. The information pulses of interest are further processed to a plurality of counters which display the time between adjacent reflected signals received from adjacent discontinuities in the temperature sensing rod from which, by using known charts, can be ascertained the temperature of the temperature sensing rod between adjacent discontinuities.

17 Claims, 2 Drawing Sheets

FIG. 3A

SIGNAL PROCESSING APPARATUS FOR ULTRASONIC THERMOMETERS

BACKGROUND OF THE INVENTION

1. FIELD OF THE INVENTION

The field of the invention is ultrasonic thermometers of the pulse-echo type and electronic apparatus for generating the electrical pulse and processing the reflected acoustical pulse to obtain temperature information.

2. DESCRIPTION OF THE RELATED ART

Ultrasonic thermometers operate on the principle that the velocity of sound in any medium is a function of temperature. In ultrasonic thermometers of the pulse-echo type, a transducer is used to produce pulsed acoustic signals which propagate down a sensor rod of a known material. Discontinuities are placed along the sensor rod at locations where temperature measurements are desired. An acoustic signal propagating down the sensor rod will reflect (in essence echo) part of its energy at these discontinuities. The time between adjacent reflections varies as a function of temperature. After calibration, temperature is obtained by measuring the time between adjacent reflections. By placing several discontinuities along the length of the rod, temperature profiles can be obtained.

Over the past several years it has been shown that ultrasonic thermometers are capable of measuring temperature in hostile environments that have precluded the use of conventional instrumentation such as thermocouples and optical pyrometers. The vast majority of this past work has been in research and development (R&D), primarily in nuclear reactor applications.

In order for the use of ultrasonic thermometers to extend beyond R&D and into industrial processing, significant improvements in accuracy, reliability, and cost must evolve through innovative developments in the field.

Some of the key areas where problems have arisen in the adaptation of ultrasonic thermometry to industrial application, and where solutions are provided by the Applicants' invention, are reviewed below.

Industrial processing is well known for its high demand for electrical power, large processing equipment, and lack of ambient temperature control. Power is commonly controlled by SCR's (Silicon Controlled Rectifiers) which, when turning on and off, create radiated interference as well as large electrical spikes on the power line. This constitutes noise which can interfere with the electronic apparatus utilized in conjunction with the ultrasonic thermometers. The large size of industry's processing equipment generally means that the ultrasonic thermometer sensor rod must be longer and that the electronic signal processing apparatus must be located at distances far away from the unit where temperatures need to be measured. This results in attenuation of the signal information which can also greatly affect the ultrasonic signal processing apparatus. Further, the lack of ambient temperature control can cause the electronic apparatus to drift resulting in error in its temperature output.

Prior ultrasonic thermometer improvements have either given little or no attention to noise problems or have employed standard noise elimination techniques such as shielding, grounding antennas, or isolating power sources. These standard techniques are not enough in industrial environments since SCR noise can be picked up by the ultrasonic sensor rod (shielded or unshielded) inside the heating unit through radiation.

In addition, prior ultrasonic thermometer inventions have either failed to compensate for errors associated with signal attenuation or improvements which have been developed have proven complex, costly, or susceptible to errors from deviations in power line voltage, ambient temperature, and other effects normally encountered in industrial environments. More specifically, prior ultrasonic thermometer electronic processing equipment utilized for time interval measurements can be classified into two general categories: (1) Peak detection systems, a discussion of which can be found in U.S. Pat. No. 3,717,033, Gordon et al. Ultrasonic Apparatus, Particularly for Thermometry, 1973, and (2) Zero Cross detection system with tracking servos, a discussion of which can be found in Sandia Report No. SAND-79-0621, G. A. Carlson, et al. "An Ultrasonic Thermometry System For Measuring Very High Temperatures in Reactor Safety Experiments."

Peak detection systems become erroneous when the peaks of the information signals vary inconsistently. Such cases are frequently encountered when attenuation occurs as a result of temperature changes along the length of the sensor line. Attenuation can change the information signals even though the temperature around the sensor location where the information signals are produced may not have changed. Changes in the information signals change the peak references and therefore produce error. This effect is of particular concern in industrial environments where the sensor line must pass through several heating zones which are independently controlled. Zero Cross detection systems with tracking servos are quite independent of signal amplitude and are therefore less susceptible to error from signal attenuation. Tracking servos, however, are inadequate for industrial application of the ultrasonic thermometer. Tracking servos, besides being costly, have a feedback loop which must be zeroed to room temperature in order to maintain a consistent tracking output. If the tracking servo loses its reference, such as would be the case during power failure or the presence of a large noise spike, the tracking servo can not be reset without introducing an error unless the system is cooled down to room temperature. It also can not be reset without the use of an oscilloscope. This is obviously impractical in industrial processing. Furthermore, tracking servos are susceptible to drift due to changes in ambient temperature. It is recognized that such drift may be prevented by the use of elaborate protection mechanisms such as ovenized enclosures but this type of solution is more than likely impractical from cost considerations.

SUMMARY OF THE INVENTION

This invention relates to electronic apparatus connected with ultrasonic thermometers used for generating the electrical pulse which initiates the operation of the pulse echo type ultrasonic thermometer, and to electronic apparatus which is used to process and display information derived from the reflected acoustic sound wave generated by the ultrasonic thermometer.

The first key aspect of the present invention is the use of electronic circuitry to generate the initiating primary electrical pulse at an optimum time of minimum interference and noise. The time that the initiating pulse is generated is chosen as the time when there is the least likelihood of electrical noise due to switching SCRs (Silicon Controlled Rectifiers), especially when around electrical furnaces. Briefly, the primary power 60 cycle sine wave itself is processed to be used as a reference for initiating pulse generation. The signal output of the initiating pulse generating circuit is then fed to the activating coil relay which switches a high voltage source to the ultrasonic thermometer. When the high voltage electrical pulse is applied to the ultrasonic thermometer temperature measurements can be normally obtained within a millisecond. Since SCRs are off for several milliseconds during any one cycle of the primary power wave, the ultrasonic thermometer can be set with the circuitry provided by the present invention to measure temperature during the off position of the SCR. This circuitry makes it possible for the present invention to provide temperature measurements which are free of noise interference in industrial environments.

A second key aspect of the present invention is the adaptation of an Automatic Gain Control (AGC) circuit to maintain a constant level of amplification independent of changes in the primary information signal pulses. Briefly, the initiating electrical pulse discussed above is used to devise a timing pulse, or sync signal, which is later used to start operation of the electronic circuitry. The initiating pulse and the returned reflected (information signal) pulses are processed by multiple states of amplification by an AGC Amplifiers and Interface electronic circuitry (Pulse Amplifier and Transmitter) for transmittal to the information signal processing circuitry (Pulse Processor) of the Temperature Display Main Frame which may be located at distance of 100 feet or more from the ultrasonic thermometer. Because of the possibility, and probability, that there will be line losses and attenuation of signals, the information signal processing circuitry returns a signal to the Pulse Amplifier and Transmitter circuit to assure that at all times the electrical pulses sent to the signal information processing circuitry is sufficiently great enough in amplitude to contain useful information. The use of an AGC circuit in the present invention allows a large degree of flexibility in the adaptation of the invention to various applications since it assures a constant output independent of signal losses or gains. This is particularly important in many industrial applications where signal losses can be very significant due to sensor rod attenuation at high temperatures or long transmission lines.

A third key aspect of the present invention in the adaptation of a simple but very powerful Zero Cross detection system to process the information signals. This circuitry is generally located a distance away from the ultrasonic thermometer in the Temperature Display Main Frame as part of the information signal processing circuitry (Pulse Processor). Briefly, the information signal electrical pulses, which are processed by the zero cross detection circuitry, comprise a major positive pulse, a negative undershoot pulse, and then a minor positive second pulse. The undershoot and second pulse constitute unwanted signals and add to noise which must be dealt with in the information signal processing circuitry. The system firstly removes the negative pulse and the second minor positive pulse in order that only the first returning pulse is representative of each reflected sound wave. Next, the signal is additionally processed to assure that only pulses above a threshold voltage are processed in order that any chance of processing low level noise as useful signals is avoided. The first positive pulse and all pulses above the threshold level are processed together through the NAND gates to a first timer/counter which, through a unique feedback scheme, determines a single fixed width pulse output of the NAND gates representative of each initiating pulse and each reflected signal from each discontinuity in the sensor rod.

A sync pulse processor, which forms a window time period within which all reflected pulses can be expected to be present, is combined with the initiating pulse and information signal pulses from the NAND gates at a second timer/counter. The second timer/counter deletes the initiating pulse which started the whole operation going and also deletes reflections due to weld joints and other interfaces which can be encountered in ultrasonic thermometers and processes only the return signal pulses containing the information respecting the reflected waves from the discontinuities and end of the rod. The second timer/counter then outputs pulses representative time-wise of the returned reflected signal to a decoder in the Pulse Information Display (also a part of the Temperature Display Main Frame) which outputs each of the returned reflected pulses on separate lines directed to a plurality of counters which count in fractions of a second the time difference between the first and the second reflected acoustic pulse, the second and the third reflected acoustic pulse, and so on until all times have been displayed between all discontinuities, including the last discontinuity and the end of the temperature sensing rod comprising the ultrasonic thermometer.

The Zero Cross detection system of the present invention is very stable during ambient temperature changes and does not vary in its output during attenuation of the information signal. Furthermore, it does not require zeroing adjustment at room temperature. This is very important in industrial applications where zeroing would be impractical. Another advantage of the Zero Cross detection system of the present invention is its cost since it does not require the use of an oscilloscope for operation as in the case of prior art zero cross detection systems used with ultrasonic thermometers.

Accordingly, it is an object of the subject invention to provide means by which an ultrasonic thermometer may be pulsed at times of minimum outside interference.

It is further an object of the subject invention to provide electronic apparatus to process the reflected signals from an ultrasonic thermometer in such a way as to avoid problems caused by extraneous radiated interference and line noise.

It is another object of the subject invention to provide electronic apparatus to process the reflected signal utilizing a Zero Cross detection system in such a way as to avoid costly complex circuitry which may be susceptible to ambient temperature variations, loss of power, and noise.

It is another object of the subject invention to provide electronic apparatus to provide an Automatic Gain Control to assure a constant level of amplification on the output signal to offset changes in amplitude which can occur as a result of attenuation and other line losses.

It is another object of the subject invention to combine the Zero Cross detector and the Automatic Gain Control system in such a manner to permit large degrees of variable amplification without introducing error on the output measurement of the information signal.

It is another object of the subject invention to provide electronic apparatus to measure the time that is required for an acoustic wave to propagate between adjacent discontinuities in the sensing rod of an ultrasonic thermometer for the purpose of calculating and displaying temperature.

Other objects of the invention will in part be obvious and will in part appear hereinafter. The invention accordingly comprises the apparatus comprising the construction, combination of elements, and arrangement of parts which are exemplified in the following detailed disclosure and the scope of the application which will be indicated in the Claims.

BRIEF DESCRIPTION OF THE DRAWINGS

For further understanding of the nature and object of the present invention, reference should be had to the following detailed description taken in connection with the accompanying drawings wherein.

In various views, like index numbers refer to like elements.

DETAILED DESCRIPTION OF THE PREFERRED EMBODIMENT

Figures 1, 2, 3B:
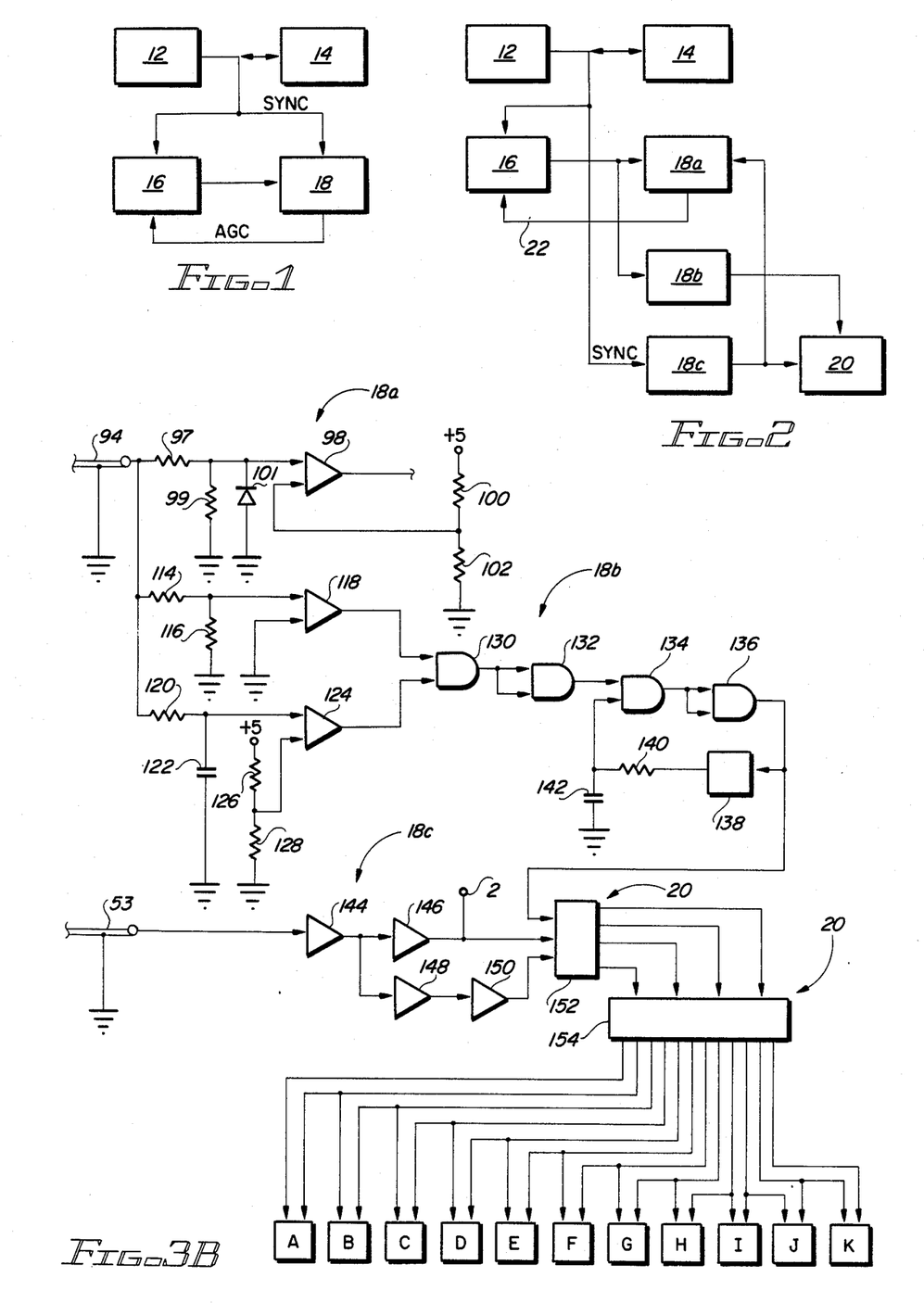
FIG. 1 is a block schematic diagram of the invention.
FIG. 2 is a detailed block schematic diagram of the invention.
FIGS. 3A and 3B are detailed schematic drawings of the invention.

As shown in FIG. 1, a block schematic diagram is shown of the complete system comprising the major blocks of the electrical Pulse Generator 12, the Sensor Acoustic Pulse Generator (Ultrasonic Thermometer) 14 which receives the initiating electrical pulse from Pulse Generator 12 to generate the acoustic pulse in the magnetostrictive head and to pick up the reflected acoustic pulses and convert them to sequential electrical information signal pulses, the AGC Amplifiers and Interface 16 (Pulse Amplifier and Transmitter) which receives the reflected information signal pulses from the ultrasonic thermometer 14 as well as the initiating pulse from the Pulse Generator 12, and the Temperature Display Main Frame 18 which receives the pulse representing the returned reflected pulses for signal information processing after initial amplification by the AGC Amplifier and Interface 16 and a sync signal (a modified form of the initiating pulse) from the Pulse Generator 12. In addition, an AGC (Automatic Gain Control) signal is returned through line 22 to the AGC Amplifiers and Interface from the Temperature Display Main Frame.

FIG. 2 is a detailed block schematic diagram of the invention wherein the Temperature Display Main Frame has been broken up into its four major component parts, namely the AGC (Automatic Gain Control) circuitry 18a, the Information Signal Pulse Processor 18b comprising among other circuits the zero cross detector and the peak detector for zero crossing discussed later, the sync pulse processor 18c, and pulse information display 20. Three of four components of the Temperature Display Main Frame together comprise the Pulse Processor, namely blocks 18a, 18b, and 18c.

The Automatic Gain Control circuitry 18a receives the initiating electrical pulse and the sequential electrical information signal pulses from the AGC Amplifiers and Interface (Pulse Amplifier and Transmitter) 16 to sense the magnitude of the pulses transmitted and then returns to the AGC Amplifiers and Interface an AGC signal which is utilized therein to boost the output of the transmitted signal as needed. The Information Pulse Processor 18b similarly receives the initiating electrical pulse and sequential electrical information signal pulses from the AGC Amplifiers and Interface (Pulse Amplifier and Transmitter) 16 and processes the signals there to reduce them to a single electrical pulse of fixed width representing each of the initiating electrical pulses and each sequential information signal electrical pulses (which ultimately are of value) and which are of magnitude greater than a first threshold positive voltage, thus eliminating noise on the signal lines which might be interpreted as information signals.

Next, the Sync pulse processor 18c utilizes its electronic circuitry to generate a time window within which only the expected sequential information signal electrical pulses are, or are expected to be, present to combine the time window with the output of the Information Pulse Processor 18b.

Lastly, the Pulse Information Display 20 receives the time window signals and the sequential information signal electrical pulses of value and displays the time, in microseconds or other units desired, between each sequential information signal electrical pulses and thus the time required for the acoustic signal to propagate between adjacent discontinuities in the temperature sensing rod (sensot rod) of the ultrasonic thermometer. Once the time period for propagation of the acoustic wave between each discontinuity is known, and knowing the material from which the temperature sensing rod is constructed, the temperature between each discontinuity in the rod may be determined from available charts.

Figure 3A:
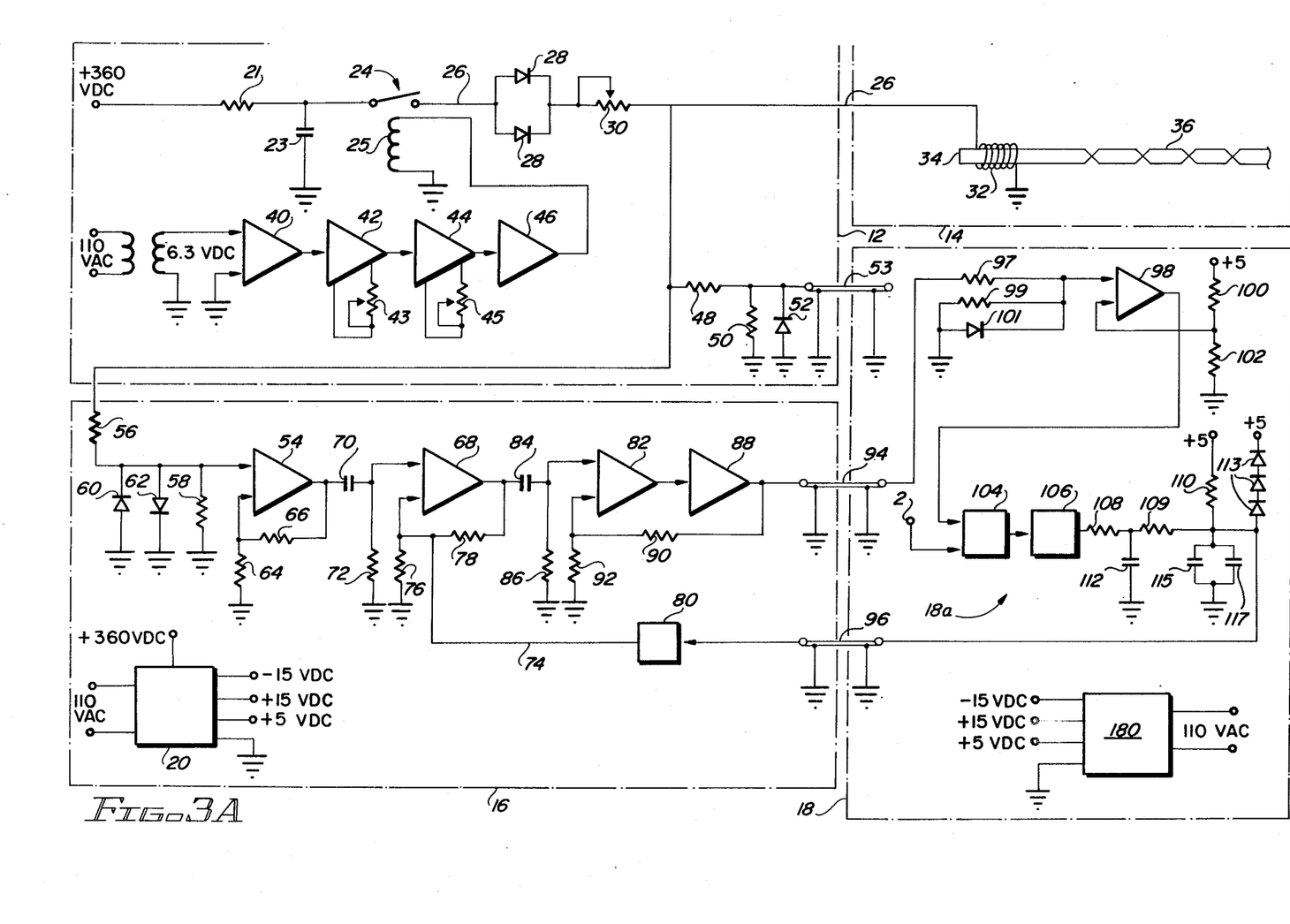

Discussing now briefly the contents of each of the schematic blocks shown in FIGS. 1 and 2, reference is made to the FIGS. 3-A. and 3.B.

Referring first to FIG. 3.A., a circuit diagram of a portion of the subject invention is detailed, namely Pulse Generator 12, Sensor Acoustic Pulse Generator (Ultrasonic Thermometer) 14, AGC Amplifier and Interface (Pulse Amplifier and Transmitter) 16, and the AGC circuit 18a portion of Temperature Display Main Frame 18. Firstly, and beginning at the upper left hand portion of the circuitry inside block 12 (dotted), a source of electrical power, namely positive 360 volts dc (direct current) exists to provide the initial means of electrical energy to the pulse generation circuit. This source of energy is generated by power supply 20 shown in block 16. Coupled to the source of the high positive voltage is current limiting resistor 21 which permits charge capacitor 23 to charge up during periods of time when the contacts of pulse relay 24 are open. Current limiting resistor 21 and charge capacitor 23 are chosen such that sufficient current flows to charge capacitor 23 to a full 360 volts and be fully charged prior to pulse relay 24 repeated closing at the highest expected operation repetition rate. When pulse relay 24 does close, the electrical charge stored on charge capacitor 23 is conducted on pulse line 26 through forward biased diode pair 28, through impedance matching variable resistor 30 and to coil 32 surrounding the magnetostrictive head element 34 welded to the temperature sensing rod 36. By means of the forward biased diode pair 28, any negative pulse undershoot of the primary current pulse is blocked. Coil impedance matching variable resistor 30 is generally adjustable in the range of 0 to 100 ohms. This pulse, which is the initiating pulse for all circuitry, nominally has a potential of 360 volt dc (at relay 24) and a width of approximately 5 $\mu$sec.

The circuit means generating the signal which opens and closes relay 24 through its coil 25, which is also the circuit means for varying (or choosing) the ultrasonic thermometer operation repetition rate and the circuit means for delaying (or adjusting) the commencement of the start of the initiating electrical pulse, and thus invention operation relative to the 60 cycle power sine wave, is detailed in FIG. 3.A. immediately below relay 24. Here, 110 volt ac power input is transformed by means of filament transformer 38 to obtain a 6.3 volt ac output. This output is directed to the first input of a type VA 710 comparator 40 which has its second input grounded. By such connection, only positive halves of the 60 cycle sine wave are conducted through comparator 40 resulting in an output comprising a square wave which has a pulse repetition rate of 60 cycles (Hertz) per second, and half the width of a complete 60 cycle sine wave. The output of comparator 40 is then conducted to the input of a type 555 timer 42 which triggers on the negative going edge of the incoming square wave to output a positive pulse of fixed time period or width. The width of the output pulse from timer 42 is adjusted by external resistor 43 connected to timer 42 in accordance with instructions published and sold with the integrated circuit units. To reduce the repitition rate, a width greater than one period of the 60 cycle sine wave is chosen and the timer does not retrigger during the comparator output pulse upon the next following 60 cycle square wave or multiple square waves negative going leading edge. Therefore, the timer 42 acts as a frequency divider to output a pulse whose repetition rate is a known fraction of the 60 cycle repetition rate. It is also noted that if the output of timer 42 were selected to have a pulse width less than the 60 cycle period (16.7 msec.) its repetition rate would then be 60 cycles. Further, if timer 42 is wired to trigger on positive and negative going leading edges of the square wave output of comparator 40, it would be possible, with a narrow width output pulse of timer 42 (less than ½ a 60 cycle wave form), to double the 60 cycle repetition rate. Since the pulsing rate of the ultrasonic thermometer may be set at desirable rates, adjustment of the timing circuit and the triggering elements of timer 42 permits variance over a wide range of repetition frequencies.

Thereafter, the output of timer 42 is directed to the input of delay timer 44 which triggers upon the negative going edge of the incoming positive pulse. Because one of the common uses of the subject invention is determining temperatures in electric furnaces and since many of the heating controls of electric furnaces utilize SCRs (silicon controlled rectifiers), when the SCRs switch rather large electrical transients are generated on the power lines connected to the equipment and are radiated to nearby equipment. In the case of the subject invention, since the source of all power are power supplies supplied from the 110 v. power line, as well as the filament transformer 38, and since all power lines around the furnace and in a plant are most likely interconnected, there is always an opportunity that spurious voltage spikes will appear on the electrical lines of the circuitry in the invention and cause erroneous readings. This is of particular concern in the equipment and electronic circuits which receive and process sequential information signal electrical pulses from the ultrasonic thermometer reflected acoustic waves because the pulses are of such low voltage.

Accordingly, by means of delay timer 44, adjustable delay of its output pulse from the time of receipt of the input pulse from timer 42 may be accomplished which provides adjustment from the start of the negative going portion of the incoming 60 cycle sine wave. In that way, interference from spurious electrical transients on the lines due to SCR switching which are regularly and repetitively controlled or switched at specific times during wave form periods of the electric furnace 60 cycle input power may be avoided. The output of delay timer 44 is a 5 volt positive going pulse which has a width in the range of 2 to 14 msec. depending upon the demands and the pulse width requirements of the coil 25 of relay 24.

Through circuit means using potentiometer 45 attached as external circuitry to timer 44, the time by which the commencement of signal output of delay timer 44 is delayed may be easily adjusted. For example, if it were determined that the SCR's switch at the very top of the positive half of the 60 cycle power sine wave, delay timer 44 delay may be adjusted to 2 msec. from the zero cross-over of the 60 cycle sine wave and thereby commence the operation approximately 2 msec. before SCR switching (which also allows sufficient time for one complete operation of the ultrasonic thermometer).

Thereafter, the delayed signal output of delay timer 44 is conducted to the input of a type 741 operational amplifier 46 which amplifies the pulse to a 15 volt positive going pulse having the same width as the output of the delay timer 44. The output pulse of op amp 46 is then conducted to coil 25 of the pulse relay 24 to close its contacts and thereby generate the initiating electrical pulse that starts the operation of the invention.

Above discussed was one of the three uses that is made of the initiating electrical pulse i.e., activating the temperature sensing rod of the ultrasonic thermometer. In addition, there are two other uses to which this pulse is placed. The first of these two uses is to generate a synchronization (sync) or timing pulse signal to be utilized in the Sync Signal Pulse Processor 18c of the Temperature Display Main Frame, block 18 of FIG. 1. As shown within block 12 in FIG. 3.A., the sync signal is taken from pulse line 26 after passage through the impedance matching variable resistor 30. The sync signal line ultimately connects to pulse line 26 by means of resistor 48 which, in combination with grounded resistor 50, provides a voltage divider network. Then to assure that the sync signal is clean and free of negative pulse undershoot, grounded negative clipping diode 52 is directly attached to the sync signal pulse line 53. The use to which the sync signal pulse may be put will be further discussed in connection with other components within the Temperature Display Main Frame, FIG. 3.B.

The other circuitry to which the initiating electrical pulse is directed after passage through impedance matching variable resistor 30, as well as the electrical information signal pulses outputted from coil 32 representative of the reflected acoustic pulses, is the AGC (Automatic Gain Control) Amplifiers and Interface (Pulse Amplifier and Transmitter) shown as block 16 in FIGS. 1 and 2. FIG. 3.A. shows a schematic diagram of Block 16. The Pulse Amplifier and Transmitter is the circuit means by which the initiating electrical pulse and information signal pulses are received, amplified, and transmitted to the Temperature Display Main Frame, block 18. Firstly, the initiating electrical pulse is prepared for introduction into the first input of a first low noise operational amplifier 54 by utilizing a voltage divider network comprising resistor 56 in the direct line of the pulse signals with resistor 58 to ground. Further, to assure that there are no spurious electrical transients upon the input line of op amp 54, positive and negative clipping diodes 60 and 62 are attached between the input and ground. The anode and cathode of each of the clipping diodes are reversed with respect to each other in order that any voltage appearing on the pulse line greater in magnitude, either positive or negative, then the voltage drop across the diodes (normally 0.7 volts) is immediately grounded. Lastly, the gain of op amp 54 is controlled by the means of the choosing of grounding resistor 64 and feedback resistor 66, resistor 64 grounding the second input to op amp 54 and resistor 66 in the feedback loop connecting the output of op am 54 back to its input and to resistor 64. Normally the gain is set between 10 and 15 by choice of these resistors.

The output of operational amplifier 54 is conducted to the first input of second amplifier 68 after passing dc blocking capacitor 70. Amplifier 68 is characterized as a high slew rate amplifier. Further, the first input to amplifier 68 is also tied to pull-down resistor 72, the other end of which is connected with ground, and thereby dc biasing the input to ground. The second input to amplifier 68 is connected to the AGC (Automatic Gain Control) line 74 which is returned to the AGC Amplifiers and Interface (block 16 of FIG. 1) by the automatic gain control circuitry 18a of Temperature Display Main Frame 18. The AGC feedback from the Temperature Display Main Frame (which may be located up to a distance of 100 feet or so from the AGC Amplifiers and Interface) assures that the signal processed through the amplifiers 68, 82, and 88, which make up the majority of the amplifiers, is of sufficient voltage amplitude to be useful by the time it reaches the Temperature Display Main Frame. Attached to the AGC line 74 is grounding resistor 76 which, working in combination with feedback resistor 78 and the voltage on AGC line 74, determines the gain of amplifier 68. Amplifier 68 is nominally set, through gain resistor 78 and grounding resistor 76, to a gain of approximately 4. Inserted in the AGC line 74 is FET transistor amplifier 80 which is characterized as a low noise amplifier having a high input impedance. The FET transistor amplifier 80 receives the AGC signal from the Temperature Display Main Frame and outputs the signal to the second input of amplifier 68.

Thereafter, the electrical pulse output of amplifier 68 is conducted to the first of two inputs of third amplifier 82 which is also characterized as a high slew rate amplifier. Like the output of the previous amplifier 54, the output of amplifier 68 is connected to dc blocking capacitor 84 and thereafter attached to pull-down resistor 86 which assures that the input to amplifier 82 is dc biased to 0 volts, or ground. Amplifier 82 works in conjunction with buffer amplifier 88 to whose input amplifier 82's output is directed. Amplifier 88 gain is 1, however, amplifier 82 gain is set by the combination of feedback resistor 90 and grounding resistor 92, nominally about 5. Amplifier 88 is a buffer amplifier featuring a high current output with low output impedance.

Thereafter, the output of amplifier 88 is directed to the coaxial line 94 which traverses the distance to the remotely located Temperature Display Main Frame (block 18 FIG. 1) which may be 100 feet or more away from the AGC Amplifiers and Interface (block 16, FIG. 1), where information processing of the electrical pulse signals is accomplished. At this point, the signal output of amplifier 88 comprises the initiating electrical pulse that was generated by pulse relay 24 and the sequential information signal electrical pulses which have been generated from reflections by the discontinuities in ultrasonic thermometer temperature sensing rod or wire 36 and picked up by coil 32 surrounding the magnetostrictive head element 34 connected to temperature sensing rod 36. All these signals are the amplified signals which are conveyed to the temperature display main frame. Further, as shown in FIG. 3.A., the AGC signal on line 74 is conducted from the Temperature Display Main Frame to amplifier 68 of the AGC Amplifiers and Interface (Pulse Amplifier and Transmitter) by means of twisted shielded pair 96. In addition, as shown in FIG. 3.A., the sync signal is conveyed by means of twisted shielded pair 53 to the Temperature Display Main Frame, block 18.

Now, discussion will center on the components which comprise the Temperature Display Main Frame as shown by block 18 of FIG. 1, a portion of which is shown in FIG. 3.A. and are the various different circuit means by which the initiating electrical pulse and the information signals are utilized to obtain useful information or data from.

Still referring to FIG. 3.A., the output of amplifier 88, after traveling the distance of coaxial line 94, is inputted into three separate comparators, the first of which is shown in FIG. 3.A., as the AGC circuitry comparator 98, all within block 18a. The other two comparators are portions of additional equipment which will be later discussed in connection with FIG. 3.B. Continuing on, the output of amplifier 88 directed to the first input of comparator 98 where it is compared in magnitude to the second input, a voltage obtained from a voltage divider network made up of resistors 100 and 102 (which may be portions of a potentiometer) connected between +5 volts and ground. The first input signal to comparator 98 is initially passed through a resistor divider network made up of input resistor 97 and ground resistor 99. In addition, all negative voltages on the first input line are grounded (those greater than −0.7 volts) by negatively biased clipping diode 101. Normally, the resistor divider network is set to input a voltage of approximately +0.65 volts to comparator 98. Therefore, only the initiating pulse and information signals outputted from amplifier 88 which are of a greater positive magnitude than the input obtained from the resistor divider network results in a positive output from comparator 98. This in effect places a positive threshold on the input signals to comparator 98 and as a consequence, prevents low level noise which may have been picked up on the signal line to be continued into the AGC circuitry. In addition, comparator 98 is utilized as an inverting comparator which inverts the output, thus giving a 0 volt output pulse for a positive voltage input, and then returns to +5 volt level with no input. Consequently, except for the time that positive pulses of sufficient amplitude are present on both the inputs, the output of comparator 98 is a constant level, a positive 5 volts.

The output of comparator 98 is directed into the first input of a type 74121 single shot multivibrator 104 which outputs a signal having a fixed height of positive 5 volts and a fixed width determined by externally added resistors and capacitors to the integrated circuit comprising multivibrator 104. Multivibrator 104 has a second inhibiting input (terminal 2) which receives the first of the window pulses from the sync circuit timer 146 (FIG. 3.B.) later discussed. The presence of this first of the window pulses upon the second input of multivibrator 104 inhibits an output from the time of the arrival of the initiating pulse to just before the first information signal pulse is expected. Thus the multivibrator does not output a pulse until the first of the information signal pulses is received. The pulse width of the output of the multivibrator is usually set in the range of 20 to 30 μsec.

The output of the multivibrator 104 is then directed to the input of inverter buffer/driver 106 characterized as having an open-collector high voltage output. The output of inverter buffer/driver 106, which is the collector of a transistor in the integrated circuit comprising inverter buffer/driver 106, connects to output resistor 108 and then capacitor 112 to ground to generate a slight time delay. From there, the signal is boosted to +5 volts during times of 0 volt output by means of inline resistor 109 and pull up resistor 110 connected to a positive 5 volt potential. Voltage spikes more positive than 5 volts plus the voltage drop across series diodes 113 are shunted to the +5 volt supply. Further, parallel smoothing capacitors 115 and 117 also connect to the output of inverter buffer/driver 106. Capacitors 115 and 117 further tend to ground any sharp edges of the output pulse from inverter buffer/driver 106 and make its transistion between voltage levels rather gradual.

The output of inverter buffer/driver 106 continues to twisted shielded pair 96 and thus becomes the AGC output on line 74 which is described in connection with the AGC Amplifiers and Interface above, block 16 of FIG. 1. Essentially, the output of inverter buffer/driver 106 is a varying dc voltage which is returned to FET Amplifier 80 and to the AGC amplifiers and interface to increase or decrease the gain of amplifier 68 in order that a sufficient voltage pulse level is received at the Temperature Display Main Frame to trigger comparator 98. Thus the electronic components from coaxial line 94 through the output of inverter buffer/driver 106 and to twisted shielded pair 96 are the circuit means by which the AGC signal is generated for increasing or decreasing the output of the AGC Amplifiers and Interface previously discussed.

The other two circuits to which the initiating pulse and information signal pulses transmitted from buffer/driver amplifier 88 through coaxial line 94 are shown in FIG. 3.B. where, for convenience, coaxial line 94 is again duplicated. For ease of understanding, a portion of the AGC circuitry comparator 98 together with its associated inputs circuitry is also shown. The two other circuits to which the electrical pulses output of coaxial line 94 are directed is the circuit means by which the initiating electrical pulse and the information signal pulses are processed to firstly segregate all positive pulses and all positive pulses above a defined threshold and then to generate a single and sole electrical pulse representative of the initiating electrical pulse and generate a single pulse representative of the reflected signals from each discontinuity in the rod. Firstly, the output of coaxial line 94 branches off to a first circuit means, the Zero Cross Detection System, starting with the zero crossing comparator 118, the first input to which being reduced through a resistor divider network comprising input resistor 114 and ground resistor 116. The second input to zero cross comparator 118 is grounded. Therefore, the output of comparator 118 will be a positive going pulse of +5 volts magnitude having a width equal to the positive going portion of all initiating and information signal pulses transmitted over coaxial line 94 and present at comparator 118 first input.

Next, the last remaining electronic circuit receiving the initiating electrical pulse and information signal pulses from coaxial line 94 is the second circuit means, namely the Peak Detector for Zero Crossing system, starting with the peak detector for zero crossing comparator 124, which has upon its first input the output of coaxial line 94 interrupted by input resistor 120 and time delay capacitor 122, the other end of which is grounded. The effect of resistor 120 and capacitor 122 is to delay slightly, in the order of a microsecond or so, the input pulse to the comparator 124 first input. The second input to comparator 124 is a fixed threshold voltage obtained from the voltage divider network made of resistors 126 and 128, resistor 126 connected to +5 volts and resistor 128 grounded. Resistors 126 and 128 are so chosen so that the threshold voltage at the second input to comparator 124 is approximately 2.5 volts positive. Resistors 126 and 128 may also be two sides of a potentiometer. Thus, the peak detector for zero crossing comparator 124 will only pass positive going signal information pulses received from coaxial line 94 which have an amplitude greater than the threshold input reference voltage determined by resistors 126 and 128, nominally 2.5 volts. By this means, low level noise associated with the signal information pulse and randomly upon the signal lines is not passed through comparator 124, which, deserving its name, only passing the peaks above the threshold voltage of the initiating electrical pulse and information signal pulses received from the AGC Amplifier and Interface circuitry.

The output of comparator 118 is a series of +5 volt pulses representative of all signals greater than zero volts from the AGC Amplifiers and Interface (Pulse Amplifier and Transmitter) 16, and the output of comparator 124 is a series of +5 volt pulses (slightly delayed) representative of pulses from the AGC Amplifier and Interface 16 which are greater than the fixed reference threshold voltage determined by resistors 126 and 128 (+2.5 volts). Both the outputs of comparators 118 and 124 are directed to the input of a type 74132 NAND gate which is an inverse outputting AND gate. The only pulses to pass NAND gate 130 are representative of the signal information pulses from the buffer amplifier 88 which, after traversing coaxial line 94, have sufficient amplitude to trigger both comparators 118 and 124. The output of the NAND gate 130 is inverted which means that it is at a plus 5 volts level except for the times that signals are received from both comparators 118 and 124, at which time the output goes to 0 volts. The output of NAND 130 then is conveyed to both the first and second input of NAND 132 which then outputs a signal representative of the combined outputs of comparators 118 and 124. It is realized that the pair of NAND gates 130 and 132 work in conjunction as an AND gate so the net result is that there is a output from NAND gate 132 each time there are both positive pulse outputs from comparators 118 and 124.

Since the information signal pulses which are outputted by coil 32 surrounding the magnetostrictive element 34 (FIG. 3.A.) comprise a first major positive rounded pulse, followed by a negative rounded pulse of lesser (absolute) magnitude and then finally followed by a third positive rounded pulse of still lesser magnitude (first pulse, then undershoot, and ringing), it is useful to clean this signal up for measurement purposes by doing away with the negative pulse portion and the second positive rounded pulse portion. Eliminating the second positive pulse is accomplished by the circuitry following NAND gate 132. Prior to this time, the negative portion of the signal information pulse was eliminated by means of the comparators 118 and 124 whose second inputs were either grounded or a positive voltage, and thus eliminated the opportunity of the comparators responding to the negative portion of the return signal.

The output of NAND gate 132 is directed to the first input of a third NAND gate 134 which has as a second input a pulse from circuitry which will be soon discussed. The output of NAND 134 is then directed to both the first and second input of fourth NAND gate 136. The output of NAND gate 136 is then directed to the input of a single shot multivibrator 138. By means of the normal resistance-capacitance external circuitry added to the single shot multivibrator 138, the period of its output pulse (in the order of 10 $\mu$sec) is set such as to be longer than the time period beginning at the first major positive pulse through the end of the second minor positive pulse, nominally 5 to 6 microseconds. The inverse output of the single shot multivibrator 138 is utilized which is then directed back to the second input of NAND gate 134 through output resistor 140 and delay capacitor 142. The inverse output of the single shot multivibrator 138 is used rather than the normal usual triggered pulse output in order that the second input to the third NAND 134 is at a signal level, nominally 5 volts, except when multivibrator 138 is pulsing. In this manner, there will most always be a signal input to the second input of third NAND 134 so that when the pulse is received by the first input to NAND 134 from the output of NAND 132, the pulse is passed through (although inverted) to the fourth NAND 136 and then outputted to multivibrator 138. Multivibrator 138 then will change states, outputting a pulse on its normal output line and going to zero volts on its inverting output line directed to the second input of NAND gate 134. Resistor 140 and capacitor 142 attached to multivibrator 138 acts to delay this output signal. Thus NAND gate 134 does not pass pulses from NAND 132 after the delay caused by resistor 140 and capacitor 142 (since the inverting output of multivibrator 138 has gone to zero) and during the period of time that multivibrator 138 is outputting its signal (thus zero on its inverting output). As a result, all pulses from NAND gate 136 are inhibited during the period of time determined by multivibrator 138 output pulse width after the receipt of the first positive going pulse from NAND gate 132. It is obvious that only one pulse then outputs from NAND gate 136 which begins at the beginning of each initiating pulse and the information signal pulse and has a duration equal to the delay in the output of multivibrator 138 caused by resistor 140 and capacitor 142 (1 to 2 $\mu$sec.). It is also obvious that the second pair of NAND gates 134 and 136, like first pair of NAND gates 130 and 132, work in combination as a single AND gate; however, the NAND gate circuitry was utilized because the integrated circuits used in the embodiment included such circuitry in combination with other circuits needed. AND gates may obviously be substituted.

The output of NAND gate 136 will be further processed and is discussed shortly. The pulses which are present on the output of NAND gate 136 are a series of distinct separate pulses, one of each representing the initiating pulse and one representing each of the reflected information signal pulses from each discontinuity received by the coil 32 surrounding magnetostrictive element 34. These pulses are repeated every new cycle brought on by closing pulse relay 24 contacts. Thus, the Information Pulse Processor (block 18b) circuit means by which separate and distinct electrical pulses are generated, representing the initiating electrical pulse and acoustic pulse reflection from each discontinuity in the temperature sensing rod, has been above outlined in the discussion of the electrical circuitry from coaxial line 94 to the output of NAND gate 136.

Now it is necessary to discuss the Sync Signal Pulse Processor circuit by which the previously mentioned sync pulse is used to generate a time window period within which information signal pulses from coil 32 are accepted and all other pulses rejected. As mentioned above, the sync pulse is derived from the initiating pulse used to start the system and energize coil 32 to form the initial acoustic wave which travels down the temperature sensing rod to be reflected by each discontinuity. Also as previously mentioned above, the voltage divider network made up of resistors 48 and 50 (FIG. 3.A.) are such as to reduce the sync signal to a manageable voltage, normally in the range of a few volts, at which time back biased diode 52 grounds all negative portions of the signal. Since the resistor divider network formed from resistors 48 and 50 reduce the signals by such a large amount, the signals received from coil 32 caused by the reflected acoustic waves, which are also present on the input to the resistor divider network, are of such small amplitude when compared to the initiating pulse, that such signals are extremely small and not distinguishable from low level noise on the sYnc signal line 53 as shown in FIG. 3.A.

It is also useful if, in addition to removing the second positive pulse on the signal information line 94 as was previously discussed, unwanted reflected signals can be eliminated, remembering of course, the wanted signals are the reflections from each of the specifically located discontinuities in the temperature sensing rod. Unwanted reflections are reflections from discontinuities such as the weld joint between the magnetostrictive head and the temperature sensing rod. In addition, since from the way the rods ar used in the furnaces, information from the start of the initiating acoustic pulse until the first placed discontinuity in the sensor rod is returned is really not of much value because generally that is the portion of the temperature sensing rod outside or partially outside the furnace. What is of interest to the operator in most cases are the reflected signals from the first placed discontinuity or notch in the temperature sensing rod to the last placed discontinuity or perhaps, to the end of the rod. All other signals are extraneous and may serve to create error. Accordingly, it is useful if the circuitry is so arranged as to block out and not process any signals which may appear on the information signal line (coaxial line 94) which are outside the time period of the information signals of interest. Additionally, since the propagation rate of the acoustic pulse in the temperature sensing rod and, for that matter, in the magnetostrictive element, is known, and the length of the temperature sensing rod, together with the temperatures or range of temperatures expected to be sensed and the propagation rate of the acoustic wave in the temperature sensing rod at the expected temperatures is known, for any temperature sensing rod using known materials the expected time or range of times for the acoustic pulse to be generated in the magnetostrictive rod to propagate down the temperature sensing rod and be reflected from the first and other discontinuities, and from the end of the temperature sensing rod, can be determined. Therefore, if a time window can be formed extending from the time just before the expected return of the reflected acoustic wave from the first discontinuity to just beyond the time that the acoustic wave should return from the end of the rod, then all pulses not included within this window time can be excluded, including the initiating pulse and unwanted reflections, such as from the weld joint.

To accomplish designing this window of time, the Sync Signal Pulse Processor circuitry associated with the sync pulse, which is the pulse issued at the same time as the initiating pulse, is next to be described. The sync signal is sent from the Pulse Generator circuitry (block 12) by means of a twisted shielded pair 53 to the Temperature Display Main Frame 18 similarly as was the information signal pulses from the AGC Amplifiers and Interface (Pulse Amplifier and Transmitter, block 16). Accordingly, as shown in FIG. 3.B., the sync pulse as received from line 53 is first directed to inverter 144 which will output a voltage level of +5 volts except for the period of time that the sync pulse is present. The output of the inverter is then directed to a pair of timers, namely first timer 146 and second timer 148. Both timers initiate pulses upon the receipt of the negative going slope portion of the input pulse from inverter 144. Timer 146 has its external connections attached with resistors and capacitors in order to achieve an output positive pulse having a width in time just less than the tire it is estimated required for the acoustic pulse to travel to the first discontinuity and return. If the first discontinuity is located 1 foot from the magnetostrictive head coil, the pulse width may be slightly less than 136 μsec for a thoriated tungsten sensor rod at room temperature. This starts the time window. It will be used later, as explained, to block off signals which are on the information signal line prior to the expected return of the acoustic pulse reflected from the first discontinuity. Timer 148 is constructed through its external resistors and capacitors to output a positive pulse which would be just slightly longer than the time necessary for the acoustic pulse to travel from the magnetostrictive element to the end of the temperature sensing rod and return at the expected temperatures. This may be in the order of 813 μsec. for a 6 foot rod of thoriated tungsten at room temperatures for example. The output of timer 148 is sent to inverter 150 where the output is changed from a voltage level of 5 volts to zero volts or vice versa, depending on what the input is.

The output of the fourth NAND gate 136 previously discussed, together with the outputs of timers 146 and inverter 150 are directed to three separate inputs of timer/counter 152 (within Pulse Information Display, block 20 of FIG. 2). Firstly, the output of NAND 136 is the operating input signal for timer/counter 152 and the outputs of timer 146 and inverter 150 are input inhibitors for timer/counter 152 to prevent it from outputting a pulse. If at any time there is a pulse output of NAND 136, and there are zero levels from the outputs of timers 146 or inverter 150, then timer/counter 152 outputs an electrical pulse signal of 1 to 2 μsec. duration. However, if at any time there is an output signal from timer 146, or inverter 150 connected to timer 148, then either one or both of those signals inhibits timer/counter 152 from outputting a pulse. Accordingly, from the time of the sync pulse to the time timer 146 has terminated its output pulse is there a +5 volt level on the output of timer 146. The output from timer 148 is +5 volts or a level "1" during the period of time from the start of the sync pulse until the expected time of the return of the last reflected pulse from the end of the temperature sensing rod, and with the timer 148 output pulse being inverted by inverter 150, zero volts appears at the input to timer/counter 152 during that period of time. When the timer 148 switches to a zero volt output (end of its output pulse) at the end of the time (or slightly after) that the expected reflected pulse from the end of the temperature measurement rod has returned, then a voltage level of positive 5 volts emits from the inverter 150 to inhibit timer/counter 152. Thus, any time there is a +5 voltage level at either of the inhibiting inputs of timer/counter 152, timer/counter 152 does not emit a pulse for each pulse received from NAND 136. Only during the window time does timer/counter 152 permit the pulse from NAND 136 to trigger an output from timer/counter 152. The result is that at this point only one pulse representative of each reflection of interest are outputted from timer/counter 152.

These same inihibiting windows used in conjunction with counter timer 152 can and are often used in conjunction with multivibrator 104 shown in FIG. 18a. The effect is to inhibit a AGC output at all times except when the return information signals are passed through multivibrator 104. In this manner, all amplification feedback can be tied into the reflected signals of interest. Shown attached to the output of timer 146 is terminal 2 which is the same point as terminal 2 depicted and described as the second input to multivibrator 104 in FIG. 3.A. It has been found that only the first of the time window pulses are necessary as inhibitors in the AGC circuit.

The timer/counter 152 has four outputs upon which appear pulses representing all the reflected pulses from the first discontinuity or notch through the end of the temperature sensing rod and these four outputs are directed to the inputs of the type 74154 decoder 154 also contained in the Pulse Information Display (block 20 of FIG. 2). Decoder 154, in turn, outputs each received pulse for each discontinuity in sequential order of receipt upon separate lines, thus outputting each received pulse up to twelve pulses on twelve separate lines in the diagram shown. Decoder 154 may, of course, have more outputs than the number shown. Receiving the output pulses from decoder 154 are a series of eleven commercially available electronic time counters, A through K, also part of the Pulse Information Display circuitry. Each counter has two inputs, the first input to start the counter counting time in fractions of a second (such as millionths or billionths of a second), and the second input to turn the counter off. Thus, as shown in FIG. 3.B., the first line from decoder 154 outputs the pulse representative of the pulse reflected from the first discontinuity in the temperature sensing rod and is directed to the start input of counter A. To the turn off input for counter A is directed the second output of decoder 154 which contains the pulse representative of the pulse from the second reflected discontinuity on the temperature sensing rod. In addition, the second output of the decoder is also sent to the start input of counter B. Then, to the stop input of counter B is directed the third line of decoder 154 which contains the pulse representative of the reflected pulse from the third discontinuity in the temperature sensing rod. This scheme is continued throughout, as shown in the Figure, through the eleventh counter K which receives, as its starting input, the eleventh line from the decoder 154 and as its terminating or stopping input, the twelfth output line of decoder 12 which are respectively, pulses representative of the reflected signals from the 11th. and the 12th. discontinuity of the temperature sensing rod (the 12th. discontinuity may be the end of the rod).

Thus, counter A measures the interval of time between the first and the second reflected pulse, counter B the interval of time between the second and the third reflected acoustic pulse, counter C the time between the third and the fourth reflected acoustic pulse, counter D the time between the fourth and the fifth reflected acoustic pulse and so on up until all reflected pulses from all discontinuities, including the end of the temperature sensing rod, have been accounted for. In most temperature sensing rods, the usual number of discontinuities number less than eleven, nominally five or six.

Once the time is displayed upon the counters A through K showin the time lapse between the reflection between adjacent discontinuities in the temperature sensing rod, reference is made to available charts of known temperature sensing rod materials for fixed distances between discontinuities. In these charts, temperature is plotted on one axis and time plotted on the other. Thus, by knowing the time required for the signal to propagate the distance between two discontinuities, the temperature between any successive discontinuities can be read off the chart immediately.

The following table illustrates values of the components which are utilized in the preferred embodiment as follows. Unless a manufacturer is specified, the integrated circuits are commonly available from more than one manufacturer.

TABLE 1

| Resistors | | Capacitors | |
|---|---|---|---|
| 21 | 100K | 23 | 0.05 uF (500 v.) |
| 30 | 10 to 100 | 70 | .001 uF |
| 48 | 5.6K | 84 | .001 uF |
| 50 | 1K | 112 | 0.1 uF |
| 56 | 1K | 115 | 10 uF |
| 58 | 10K | 117 | 0.01 uF |
| 64 | 1K | 122 | .001 uF |
| 66 | 20K (Pot) | 142 | .001 uF |
| 72 | 10K | Integrated Circuits | |
| 76 | 10K | 40 | UA 710 (Comparator) |
| 78 | 20K (Pot) | 42 | 555 (timer) |
| 86 | 5K | 44 | 555 (timer) |
| 90 | 10K (Pot) | 46 | 741 (OP AMP) |
| 92 | 470 | 54 | OPA 102 (OP AMP Burr Brown) |
| 97 | 10K | 68 | AD 509 |
| 99 | 4.7K | 80 | IRFD123 Radio Shack (FET) |
| 100 | 10K (Pot) | 82 | AD 509 Burr Brown |
| 102 | | 88 | 3553 Burr Brown |
| 108 | 5K | 98 | UA 710 (Comparator) |
| 109 | 3.9 M | 104 | 74121 (Multivibrator) |
| 110 | 2 M | 106 | 7406 (Inverter Buffer/Driver) |
| 114 | 470 | 118 | UA 710 (Comparator) |
| 116 | 75 | 124 | UA 710 (Comparator) |
| 120 | 1K | 130 | 74132 (NAND gate) |
| 126 | 10K (Pot) | 132 | 74132 (NAND gate) |
| 128 | | 134 | 74132 (NAND gate) |
| 140 | 200 | 136 | 74132 (NAND gate) |
| Diodes | | 138 | 74121 (Multivibrator) |
| 28 | FD-100 | 144 | 7404 (Inverter) |
| 52 | FD-100 | 146 | 555 (timer) |
| 60 | FD-100 | 148 | 555 (timer) |
| 62 | FD-100 | 150 | 7404 (Inverter) |
| 101 | FD-100 | 152 | 74161 (Timer/Counter) |
| 113 | FD-100 (each) | 154 | 74154 (Decoder) |

In the discussion of the electronic circuitry which generates the initiating electrical pulse, and then receives and processes the reflected acoustic information signal electrical pulses from the temperature sensing rod, a voltage level of +5 volts is utilized as a logic "1" and zero volts for a logic "0" in the digital components. such as comparators, timers, multivibrators, inverters. buffer/drivers, NAND gates, decoders, and counters. The outputs, obviously, of the operational amplifiers, and buffer amplifiers issue outputs which may rise to the level of their respective power input, +15 volts. Although not discussed in connection with the detailed schematic of Temperature Display Main Frame 18, shown in FIG. 3.A., is the power supply 180 which supplies the ground, +5 volts, and plus and minus 15 volts to the circuitry in that unit. Similarly, the power supply 20 which supplies power to the AGC Amplifiers and Interface 16 and pulse generator 12, has outputs of +360 volts dc, plus and minus 15 volts dc, +5 volts, and ground. Both power supplies have inputs of 110 volts ac.

While some of the integrated circuits used have noted that where a pulse width output or delay of pulse is determined by externally added capacitors and resistors, the determination of such capacitors and resistors are in accordance with instructions furnished by the manufacturers of the integrated circuit. Similarly, the multivibrator integrated circuits utilized with inhibiting inputs and inverting outputs are all standard and are wired in accordance with instructions furnished by the manufacturer to accomplish the purposes and functions recited above.

While a preferred embodiment of the invention has been shown and described, it will be understood that there is no intent to limit the invention by such disclosure but rather it is intended to cover all modifications of the apparatus and alternate constructions falling within the spirit and the scope of the invention as defined in the appended claims.

We claim:

1. Improvements in signal processing apparatus connected with ultrasonic thermometers of the pulse echo type having a magnetostrictive head, an elongated temperature sensing rod attached to said magnetostrictive head, said rod having spaced apart discontinuities reflecting acoustic pulses, and a coil surrounding said magnetostrictive head, said coil receiving an initiating electrical pulse, generating an acoustic pulse in said magnetostrictive head for transmittal down said elongated temperature sensing rod, receiving sequential acoustic pulse reflected from said spaced apart discontinuities in said rod, and converting the received sequential acoustic pulses into sequential information signal electrical pulses, the improvements comprising in combination:

a pulse generator operably connected to said ultrasonic thermometer coil, said pulse generator repetitively generating said initiating electrical pulse;

a reference input alternating electrical current defining a 60 hertz sine wave having zero voltage crossover points, said pulse generator receiving said reference input alternating electrical current, said pulse generator including first circuit means varying the repetition rate of said initiating electrical pulse and second circuit means operably connected to said first circuit means, said second circuit means adjustably commencing said initiating electrical pulse and adjustably delaying commencement of said initiating electrical pulse relative to said zero voltage cross-over point of said alternating electrical current sine wave;

a pulse amplifier and transmitter operably connected to said pulse generator and to said ultrasonic thermometer coil, said pulse amplifier and transmitter receiving and amplifying said initiating electrical pulse and said received sequential information signal electrical pulses for transmission;

a pulse processor operably connected to said pulse amplifier and transmitter and to said pulse generator, said pulse processor receiving and processing for information said transmitted initiating electrical pulse and said sequential information electrical pulses; and a pulse information display operably connected to said pulse processor, said pulse information display receiving said processed sequential information signal electrical pulses to ascertain and display the time periods between receipt of said sequential information signal pulses whereby the temperature of the temperature sensing rod between discontinuities may be determined from the time periods of sequential reflected acoustic pulses displayed.

2. The improvements in ultrasonic thermometer apparatus as defined in claim 1 wherein said pulse generator first circuit means varying the repetition rate of said initiating electrical pulse comprises a transformer connected to said input alternating electric current, a comparator attached to said transformer, and a timer having a variable period width output pulse attached to said comparator; and said second circuit means comprises a timer connected to said first circuit means timer, said second circuit means timer having an adjustable delay before commencement of its output pulse, an operational amplifier attached to said second circuit means timer, and an initiating electrical pulse relay with a relay closing coil, said operational amplifier connected to said pulse relay closing coil whereby said first circuit means comparator receives an electrical signal from said transformer and outputs a pulse to said first circuit means timer whose output pulse period may be varied to achieve the repetition rate desired for said initiating electrical pulse, and said second circuit means timer delays commencement of said initiating electrical pulse relative to said input alternating electrical current, the output by said operational amplifier operating said pulse relay in accordance with the repetition rate determined by said first circuit means timer, and delays commencement of each said initiating electrical pulse in accordance with said second circuit means timer delay relative to the input alternating electrical current.

3. The improvements in ultrasonic thermometer apparatus as defined in claim 2 wherein said pulse amplifier and transmitter includes a first feedback amplifier having a first input operably receiving said initiating electrical pulse and said sequential information signal electrical pulses, a second feedback amplifier having a first input operably connected to said first operational amplifier, a third amplifier having a first and second input, said third amplifier first input operably connected to said second feedback amplifier and, a buffer amplifier having an input operably connected to said third amplifier and an output operably connected to said second input of said third amplifier in a feedback arrangement, said buffer amplifier output transmitting said initiating electrical pulse and said sequential information signal electrical pulses to said pulse processor.

4. The improvements in ultrasonic thermometer apparatus as defined in claim 3 wherein said pulse amplifier and transmitter further includes a resistor divider circuit network and a pair of oppositely biased grounded diodes attached to said first feedback amplifier first input, and said second feedback amplifier having a second input receiving an automatic gain control signal whereby said initiating electrical pulse and said sequential information signal electrical pulses may be limited at the first input of said first feedback amplifier and the gain of said second feedback amplifier may be varied in accordance with an automatic gain control signal so received.

5. The improvements in ultrasonic thermometer apparatus as defined in claim 1 wherein said pulse processor further includes an information signal pulse processor circuit generating one electrical pulse for each said initiating electrical pulse and one electrical pulse for each said sequential information signal electrical pulses.

6. The improvements in ultrasonic thermometer apparatus as defined in claim 5 wherein said information signal pulse processor circuit generating one pulse for each said initiating electrical pulse and each said sequential information signal pulses includes a zero cross detector circuit eliminating all negative pulses, and a peak detector circuit eliminating all negative pulses and positive pulses which are less than a first threshold positive voltage.

7. The improvements in ultrasonic thermometer apparatus as defined in claim 6 wherein said zero cross detector circuit includes a first comparator having a first input, second input, and output, said first comparator first input operably connected to said pulse amplifier and transmitter, and said first comparator second input grounded; and said peak detector circuit including a first comparator having a first input, second input, and output, said peak detector circuit first comparator first input operably connected to said pulse amplifier and transmitter, and said peak detector circuit first comparator second input operably connected to a resistor divider circuit network connected between a positive voltage and ground inputting a first threshold positive voltage whereby said zero cross detector circuit first comparator passes only positive electrical pulses, and said peak detector circuit first comparator passes only positive electrical pulses greater than said first positive threshold voltage.

8. The improvements in ultrasonic thermometer apparatus as defined in claim 7 further including a first pair of connected NAND gates having a first and second input, and an output, said first pair of connected NAND gates first input receiving said output of said zero cross detector circuit first comparator, and said first pair of connected NAND gates second input receiving said output of said peak detector circuit first comparator; a second pair of connected NAND gates having a first and second input, and an output, said second pair of connected NAND gates first input receiving said output of said first pair of connected NAND gates; and a multivibrator having an input and an output, said input operably connected to said output of said second pair of NAND gates, and said multivibrator output responsive to multivibrator said input and having a pulse of fixed time period width, said width greater than each of said sequential information signal electrical pulses, said multivibrator output operably connected to said second paid of NAND gates second input; and a resistor and grounded capacitor operably attached to said multivibrator output delaying for a fixed time period said multivibrator output pulse whereby the output of said second pair of NAND gates is representative of all positive pulses greater than said second threshold voltage and has a pulse width equal to the fixed time period delay of the output of said multivibrator to said second pair of NAND gates second input, and thus the output of said second pair of NAND gates is one pulse of fixed time period width for each said positive initiating electrical pulse and for each said positive sequential information signal electrical pulses.

9. The improvements in ultrasonic thermometer apparatus as defined in claim 8 wherein said fixed time period delay caused by said resistor and grounded capacitor operably connected to said multivibrator output is of a time period less than the time period between adjacent said sequential signal information pulses whereby the output of said second pair of NAND gates is a pulse having a width less than the time period between adjacent said sequential signal information signal pulses.

10. The improvements in ultrasonic thermometer apparatus as defined in claim 5 wherein said pulse processor additionally includes a sync pulse processor, said sync pulse processor generating a window time period within which said sequential information signal electrical pulses may be received for information processing.

11. The improvements in ultrasonic thermometer apparatus as defined in claim 10 wherein said sync pulse processor includes a first circuit generating a pulse commencing at said start of the initiating electrical pulse and terminating just prior to said sequential information signal electrical pulses, and a second circuit generating a pulse commencing just after the termination of said sequential information signal electrical pulses whereby a time period window is created between the termination of the first circuit generated pulse and the commencement of the second circuit generated pulse and within which said sequential information signal electrical pulses may be received for determination of the time interval therebetween.

12. The improvements in ultrasonic thermometer apparatus as defined in claim 11 wherein said sync pulse processor first and second circuit includes a first and second timer respectively, each timer having an input and an output, the input of both said timers operably connected to said pulse generator receiving said initiating electrical pulse, said first timer output being a pulse commencing with said initiating electrical pulse and having a time width such as terminating just prior to the receipt of said sequential information signal electrical pulses, and said second timer having an output commercing upon said initiating electrical pulse and having in output of time period length greater than the period required to receive all said sequential information signal electrical pulses; said second circuit including an inverter having an input and output, the input of said inverter connected to said second timer output whereby said first pulse and said second pulse, after said second pulse is inverted, defines a time window within which said sequential information signal electrical pulses are received.

13. The improvements in ultrasonic thermometer apparatus as defined in claim 12 wherein said pulse processor additionally includes an agc circuit generating an automatic gain control signal for feedback to said pulse amplifier and transmitter.

14. The improvements in ultrasonic thermometer apparatus as defined in claim 13 wherein said agc circuit generating an automatic gain control signal comprises a first comparator receiving said initiating electrical pulse and said sequential information signal electrical pulses from said pulse amplifier and transmitter, a first multivibrator operably connected to said first comparator and said sync pulse processor, and an inverter buffer/driver amplifier operably attached to said first multivibrator, said inverter buffer/driver amplifier having as an output said automatic gain control signal, said output returned to said pulse amplifier and transmitter.

15. The improvements in ultrasonic thermometer apparatus as defined in claim 14 wherein said agc circuit generating said automatic gain control signal first comparator includes a first input, a second input, and an output; a resistor divider circuit network and a negatively biased grounded diode attached to said first comparator first output, said first comparator second input attached to a resistor divider network connected between a positive voltage and ground inputting a second threshold positive voltage, and said first comparator having an output pulse representative only of positive voltage pulses above said second threshold positive voltage on said first input whereby all negative pulses and positive pulses less than said second threshold voltage are rejected by said first comparator.

16. The improvements in ultrasonic thermometer apparatus as defined in claim 15 wherein said first multivibrator has a first and second input, and an output, the first input of which connected to said output of said first compar tor and the second input connected to said sync pulse processor first timer output, said input being an inhibitory input, and the output of which having a fixed time period pulse width responsive to said sequential information signal electrical pulses from said first comparator; said inverter buffer/driver amplifier having an input and an output, the input of which receives the output of said first multivibrator and the output of which being said automatic gain control signal directed to said pulse amplifier and transmitter whereby said automatic gain control signal varies the output of said pulse amplifier and transmitter such that a sufficient signal is outputted to assure that said sequential information signal electrical pulses are received by said pulse processor.

17. The improvements in ultrasonic thermometer apparatus as defined in claim 16 wherein said pulse information display includes a timer/counter, a decoder operably connected to said timer/counter, and a plurality of counters operably connected to said decoder; said timer/counter having a first, second, and third input, said first input receiving said information pulse processor second pair of NAND gates output, and said second input and third input operably connected to said first timer output and said inverter output respectively, said timer/counter second and third inputs being inhibitor inputs to said timer/counter, said timer/counter having a plurality of outputs representative of pulses received from said information pulse processor only during the time window generated by said first and second timers commencing prior to and terminating after said sequential information signal electrical pulses, said timer/counter outputs connected to said decoder, said decoder having a plurality of outputs operably connected to a plurality of counters, said decoder outputting a separate pulse on each of said plurality of outputs representative of each of said sequential information signal pulses received by said pulse processing circuit; each of said counters having a start input and a stop input, said plurality of decoder outputs operably connected to said plurality of time counters start and stop inputs, each of said counters receiving a decoder output to start said counter counting and a decoder output to terminate said counter counting whereby said counter displays the time period between the receipt of each said sequential information signal pulse and thereby permits the determination of the temperature between the adjacent discontinuities in said temperature sensing rod.

* * * * *